Figure 1:
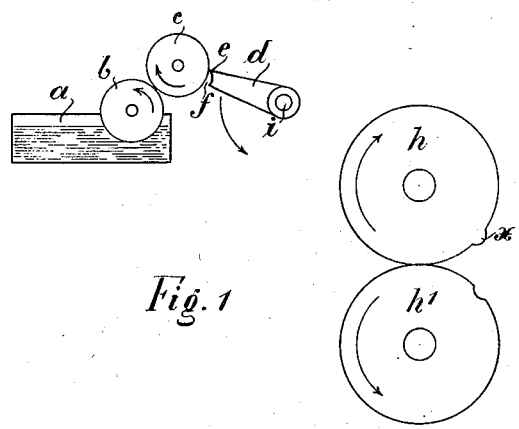

R. E. FISCHER & M. WESCHER.
GUMMING DEVICE FOR ENVELOP, BAG, AND LIKE MAKING MACHINES.
APPLICATION FILED MAR. 5, 1908.

959,493.

Patented May 31, 1910.

Witnesses:
Ernst Hasenclever
Paul Bartholomay

Inventors:
Robert Ernst Fischer
Max Wescher

UNITED STATES PATENT OFFICE.

ROBERT ERNST FISCHER AND MAX WESCHER, OF ELBERFELD, GERMANY.

GUMMING DEVICE FOR ENVELOP, BAG, AND LIKE MAKING MACHINES.

959,493. Specification of Letters Patent. Patented May 31, 1910.

Application filed March 5, 1908. Serial No. 419,294.

*To all whom it may concern:*

Be it known that we, ROBERT ERNST FISCHER, engineer, and MAX WESCHER, engineer, citizens of the German Empire, and residents of 3–5 Sandstrasse, Elberfeld, Germany, have invented new and useful Improvements in Gumming Devices for Envelop, Bag, and Like Making Machines, of which the following is a specification.

This invention relates to a gumming device for envelop making, bag making and like machines working with rotating rolls in which the adhesive is transferred by a feeder from a gumming roll to the transferring roll. In previous arrangements of this kind there has been the great disadvantage that the feeder touches only the rotating roll which is provided with gum without being able to take up a large quantity of gum so that in papers which are to be heavily gummed the amount of gum transferred is not sufficient. According to this invention this disadvantage is avoided in that the feeder has a larger circumferential velocity than the gumming roll and that the feeder is so formed that it can take up a large amount of gum.

In throwing out of gear the machine from which also the gum feeder must be disengaged it may happen that the feeder remains in that position in which it contacts with the gumming roll. This has as a consequence that the feeder lifts the gum from the gumming roll, particularly when in the out of gear position of the machine the gumming rolls are allowed to run, which is very desirable for preventing the gum from drying. In order to avoid this disadvantage the gumming device is provided with an arrangement which makes it possible to disengage the feeder so that it will remain in a predetermined position and on engagement is so set automatically that on rotation it contacts with the gum carrier proper of the transferring roll.

The gumming device is illustrated in the drawing in which—

Figure 2:
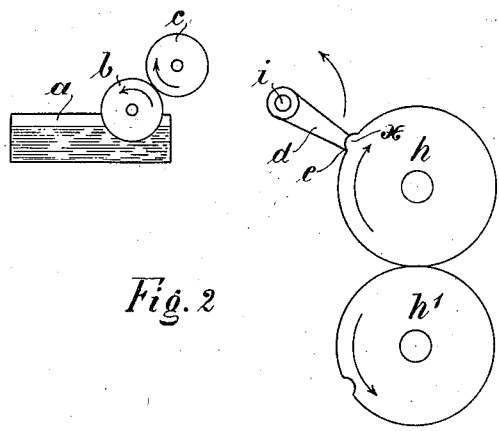
Figure 3:
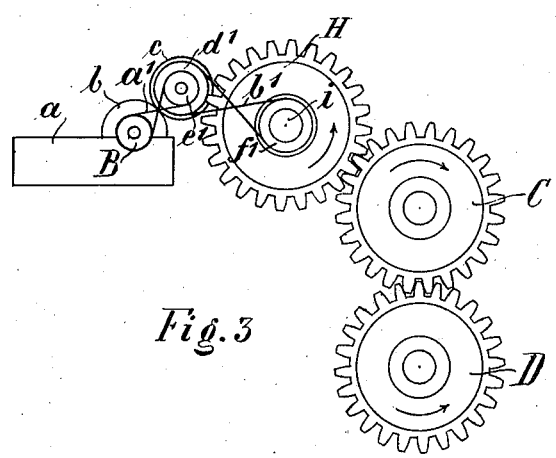
Figure 4:
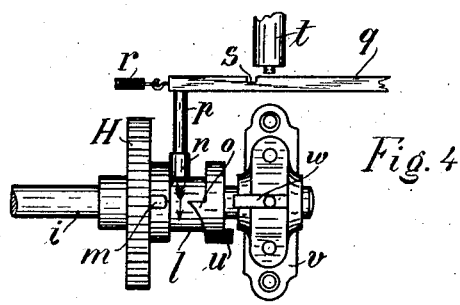
Figure 5:
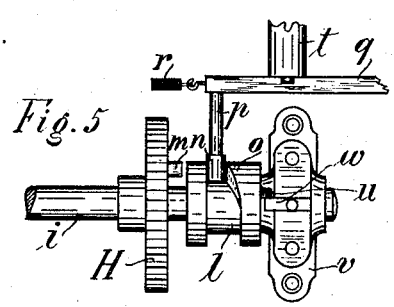

Figure 1 shows the same in the position in which the gum is being taken from the roll, while Fig. 2 shows the transferring of the gum to the gum carrier proper of the transferring roll. Fig. 3 shows the driving mechanism for the rolls and the feeder. Figs. 4 and 5 show in plan the stop motion device for the feeder, Fig. 4 showing the same with the feeder engaged and Fig. 5 showing the feeder disengaged.

Referring to the drawing $a$ is a gum reservoir in which runs a roll $b$.

$c$ is a second roll touching the roll $b$ and rotating in an opposite direction, which is attained as may be seen from Fig. 3 by the cross-belt $a^1$ passing around the pulleys B and $e^1$ fixed to the shafts of the rolls $b$ and $c$.

$d$ is the feeder the rear edge of which is higher than the front edge so as to form a groove $f$ for holding the gum scraped off by the edge $e$ from the roll $c$. The feeder $d$ is rotated by means of the pulleys $d^1$ and $f^1$ and the cross belt $b^1$ in the opposite direction to the roll $c$. The pulleys $d^1$ and $f^1$ have the same diameter. The number of rotations of the roll $c$ and the feeder $d$ is therefore the same, but as the radius of the roll $c$ is smaller than the distance between the scraping edge $e$ and the center of rotation of the feeder, the circumferential velocity of the feeder $d$ is greater than the circumferential velocity of the roll $c$. In consequence the gum is scraped off by the feeder from the roll $c$.

$h$ is the transferring roll proper with the gum carrier $x$, which takes up the gum from the groove $f$ and transfers it to the paper passing between the rolls $h$ and $h^1$. The rotation of the roll $h$ is transferred by means of the pinions C and H (Fig. 3) to the feeder $d$ and by means of the same pinion C to the pinion D of the lower roll $h^1$. The diameter of the pinions C, H, D, being the same the number of rotations of the feeder as well as of the roll $h$ and $h^1$ is always the same.

In the disengaging or uncoupling device shown in Figs. 4 and 5 $i$ is the shaft on one end of which is secured the roll $h$. On the other end of the shaft $i$ is loosely mounted a pinion H which may be coupled with said shaft. For this purpose said shaft is provided with a clutch $l$ which is so connected with the shaft by a feather and key-way that it can slide in the longitudinal direction of the shaft, but is prevented from rotation thereon. The pinion H has a lateral pin $m$ which fits a notch in the clutch $l$, as shown in Fig. 4. When the pinion H is driven its rotary movement may be transmitted by the pin $m$ to the clutch $l$ and through said clutch to the shaft so that the feeder $d$ is operated. The clutch $l$ has an annular groove in which runs a roller $n$, connected by a pin $p$ with a rod $q$. The rod $q$ and the roller $n$ connected therewith are forced by a spring $r$ toward the pinion H but can be held by a pin $t$ fitting in a notch in the rod $q$. If the rod $q$ is pulled to the right and secured as shown in Fig. 5, on rotation of the clutch $l$ its lug $a$ comes in contact with the roller $n$ and thus the disengagement takes place between the clutch and the pinion H. This position is so chosen in order that the feeder can be well timed and so that the feeder is not set in the position shown in Fig. 1, in which it would lift the gum from the roll $c$.

In order to prevent the shaft $i$ from rotating by the friction of the rotating pinion H after disengagement, the clutch $l$ is provided with another lug $u$ which immediately after disengagement comes in contact with a projection $w$ fitted on the bearing $v$. When the feeder is to be again engaged, the pin $t$ is withdrawn from the notch $s$ of the rod $q$, whereupon the spring $r$ tends to draw the roller $n$ toward the pinion H. If on rotation of the pinion H the pin $m$ comes opposite the groove on the clutch $l$ it snaps into this, coupling being thus effected and the feeder being again engaged. It is clear, that the feeder remains continuously in this position and on engagement comes into the same position relative to the continuously rotating pinion H.

What we claim as our invention and desire to secure by United States Letters Patent is:—

1. In a gumming device of the character described, the combination of a gumming roll, a transferring roll, a rotary feeder for feeding adhesive from the gumming roll to the transferring roll, and means for rotating said feeder in a direction opposite to that of the gumming roll and at a greater circumferential velocity than the gumming roll, whereby the adhesive is scraped off of the gumming roll by said rotary feeder.

2. In a gumming device of the character described, the combination of a gumming roll, a transferring roll, a roll coöperating therewith, said rolls having complementary engaging elements, and a rotary feeder for feeding adhesive from the gumming roll to the transferring roll; said feeder being provided with a scraping edge adapted to scrape the adhesive off the gumming roll and having a pocket adjacent to the scraping edge complementary to the engaging member of the transferring roll, said pocket adapted to receive the adhesive scraped off by the scraping edge and deliver the same to said engaging member of the transferring roll.

3. In a gumming device of the character described, the combination of a gumming roll, a transferring roll, a roll coöperating therewith, said rolls having complementary engaging elements, a rotary feeder for feeding adhesive from the gumming roll to the engaging element of the transferring roll, a shaft on which the feeder is mounted, a driving member for the shaft, and means whereby the driving member can be coupled to and uncoupled from the shaft; said means being effective to bring the feeder into proper relative position with said engaging element of the transferring roll.

4. In a gumming device of the character described, the combination of a gumming roll, a transferring roll, a rotary feeder for feeding adhesive from the gumming roll to the transferring roll, a shaft on which the feeder is mounted, a driving member loosely mounted on said shaft, and means whereby the driving member can be coupled to and uncoupled from the shaft; said means comprising a coupling member slidably mounted on the shaft, normally engaging the driving member and provided with a cam face, and a movable member adapted to be brought into position to be engaged by the cam face of the coupling member to cause the coupling member to be withdrawn from the driving member.

In testimony whereof we have signed our names to this specification in the presence of two subscribing witnesses.

ROBERT ERNST FISCHER.
MAX WESCHER.

Witnesses:
  OTTO KÖNIG,
  GUSTAV KALSBACH.